US012503892B2

(12) United States Patent
Cheng

(10) Patent No.: US 12,503,892 B2
(45) Date of Patent: Dec. 23, 2025

(54) GATE ASSEMBLY AND CASING WITH GATE ASSEMBLY

(71) Applicant: PEGATRON CORPORATION, Taipei (TW)

(72) Inventor: Shih-Chen Cheng, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 179 days.

(21) Appl. No.: 18/613,444

(22) Filed: Mar. 22, 2024

(65) Prior Publication Data

US 2024/0401383 A1 Dec. 5, 2024

(30) Foreign Application Priority Data

May 31, 2023 (TW) ................................ 112120413

(51) Int. Cl.
*E05C 1/16* (2006.01)
*E05B 65/00* (2006.01)
*E05C 1/00* (2006.01)

(52) U.S. Cl.
CPC .............. *E05C 1/166* (2013.01); *E05C 1/004* (2013.01); *E05B 65/0067* (2013.01)

(58) Field of Classification Search
CPC . E05C 9/04; E05C 9/004; E05C 1/166; E05C 1/004; E05B 65/0067; E05B 73/0082; E05B 65/006
See application file for complete search history.

(56) References Cited

FOREIGN PATENT DOCUMENTS

| | | | |
|---|---|---|---|
| CN | 104514452 | A | 4/2015 |
| TW | I381790 | B1 | 1/2013 |
| TW | 201431462 | A | 8/2014 |
| TW | 202204798 | A | 2/2022 |

*Primary Examiner* — Christine M Mills
*Assistant Examiner* — Faria F Ahmad
(74) *Attorney, Agent, or Firm* — McClure, Qualey & Rodack, LLP

(57) ABSTRACT

A gate assembly includes a base member, a door cover member, and an operating member. The door cover member is arranged on the base member, and includes a body, a movable portion, and two gate portions. The body is provided with a through slot and two protruding posts. The movable portion is arranged on the body and is movable relative to the body along a first axis. The movable portion is provided with two limiting posts and an accommodating portion. Two gate portions are movably arranged on the body and the movable portion. Each of the gate portions is provided with a limiting hole formed in an inclined direction and a positioning hole formed along a second axis orthogonal to the first axis. Each of the limiting posts extends through the limiting hole, and each of the protruding posts extends through the positioning hole.

10 Claims, 8 Drawing Sheets

GATE ASSEMBLY AND CASING WITH GATE ASSEMBLY

CROSS-REFERENCE TO RELATED APPLICATION

This application claims the priority benefit of Taiwan application serial no. 112120413, filed on May 31, 2023. The entirety of the above-mentioned patent application is hereby incorporated by reference herein and made a part of this specification.

TECHNICAL FIELD

The present disclosure relates to a gate assembly, and in particular, to a gate assembly applied to a casing.

BACKGROUND

In a common gate assembly, an operating button and a gate valve thereof move in the same direction, for example, both move in a vertical direction. However, this structure often needs a long stroke to make the gate valve operate smoothly, which leads to an increase in a size of the gate assembly corresponding to the stroke. In addition, because the operating button is not provided with a latch, a user may accidentally touch the operating button and open the gate assembly.

SUMMARY

In view of this, the present disclosure provides a gate assembly according to an embodiment, including a base member, a door cover member, and an operating member. The door cover member is arranged on the base member, and includes a body, a movable portion, and two gate portions. The body is provided with a through slot and two protruding posts. The movable portion is arranged on the body and is movable relative to the body along a first axis. The movable portion is provided with two limiting posts and an accommodating portion. Two gate portions are movably arranged on the body and the movable portion, and each of the gate portions is provided with a limiting hole formed in an inclined direction and a positioning hole formed along a second axis orthogonal to the first axis. Each of the limiting posts extends through the limiting hole, and each of the protruding posts extends through the positioning hole. When the movable portion moves along the first axis, the limiting post moves from one end of the limiting hole to an other end, and the protruding post moves from one end of the positioning hole to an other end, to drive and limit movement of each of the gate portions along the second axis. The operating member extends through the through slot, and includes a holding portion and a latch portion. The holding portion is located on one side of the door cover member, and the latch portion is located on an other side of the door cover member, and extends through the movable portion and the door cover member and is connected to the holding portion. The operating member is configured to drive the movable portion to reciprocate along the first axis and reciprocate relative to the movable portion along the second axis, so that a part of the latch portion is accommodated in or exposed from the accommodating portion.

In some embodiments, the door cover member further includes two open portions located on opposite sides. The two gate portions move along the second axis to selectively expose a part thereof from the two open portions.

In some embodiments, the door cover member further includes two elastic members. Two ends of each of the elastic members are connected to each of the gate portions and the body along the second axis.

In some embodiments, the through slot has a first guide slot and a second guide slot. The first guide slot is formed along the first axis, and the second guide slot is located on an end of the first guide slot and formed along the second axis.

In some embodiments, the movable portion is provided with a slide rail groove formed along the second axis. The accommodating portion is arranged on an end of the slide rail groove, and the latch portion is movably arranged in the slide rail groove along the second axis.

In some embodiments, the latch portion is provided with a hook, and the accommodating portion is provided with a groove. The latch portion reciprocates in the accommodating portion, so that the hook leaves or is accommodated in the groove.

In some embodiments, the gate assembly further includes a soft rubber member. The soft rubber member is arranged on a side of the base member opposite the door cover member.

In some embodiments, the soft rubber member is provided with an outer ring portion arranged around a periphery of the soft rubber member.

In addition, a casing with a gate assembly is provided, including a casing and a gate assembly. The casing is provided with an opening and two engagement grooves located on two opposite sides of the opening. The gate assembly is arranged on the casing and correspondingly covers or exposes the opening. The gate assembly includes a base member, a door cover member, and an operating member. The door cover member is arranged on the base member, and includes a body, a movable portion, and two gate portions. The body is provided with a through slot and two protruding posts. The movable portion is arranged on the body and is movable relative to the body along a first axis. The movable portion is provided with two limiting posts and an accommodating portion. Two gate portions are movably arranged on the body and the movable portion, and each of the gate portions is provided with a limiting hole formed in an inclined direction and a positioning hole formed along a second axis orthogonal to the first axis. Each of the limiting posts extends through the limiting hole, and each of the protruding posts extends through the positioning hole. When the movable portion moves along the first axis, the limiting post moves from one end of the limiting hole to an other end, and the protruding post moves from one end of the positioning hole to an other end, to drive and limit movement of each of the gate portions along the second axis. The operating member extends through the through slot, and includes a holding portion and a latch portion. The holding portion is located on one side of the door cover member, and the latch portion is located on an other side of the door cover member, and extends through the movable portion and the door cover member and is connected to the holding portion. The operating member is configured to drive the movable portion to reciprocate along the first axis and reciprocate relative to the movable portion along the second axis, so that a part of the latch portion is accommodated in or exposed from the accommodating portion. When the gate assembly covers the opening, a part of each of the gate portions selectively leaves or is accommodated in each of the engagement grooves along the second axis.

In some embodiments, the casing with a gate assembly further includes a soft rubber member. The soft rubber member is arranged on a side of the base member opposite the door cover member, and the soft rubber member is provided with an outer ring portion arranged around a periphery of the soft rubber member. The outer ring portion is in close contact with the casing and is squeezed and deformed due to elasticity of the outer ring portion.

Based on the above, a gate assembly and a casing provided with the gate assembly are provided according to an embodiment. The operating member drives the movable portion to move, so that the gate portion moves in a direction orthogonal to a direction in which the movable portion moves. In this way, through the movable portion and the gate portion moving in different directions, a movement stroke in the same direction is reduced, and then a size of the gate assembly may be reduced. Further, the movement of the operating member is selectively restricted through the latch portion of the operating member, so as to prevent the user from accidentally touching and opening the gate assembly.

DETAILED DESCRIPTION

Figure 1:
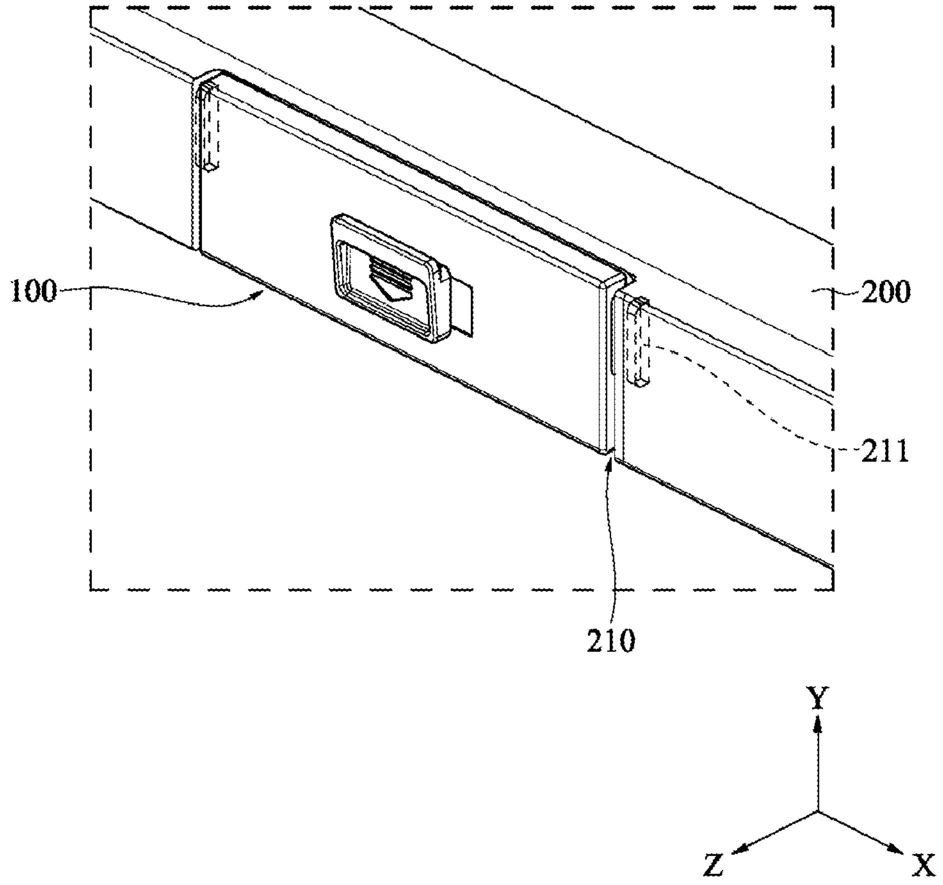
FIG. 1 is a schematic partial view of a casing with a gate assembly according to an embodiment.
Figure 2:
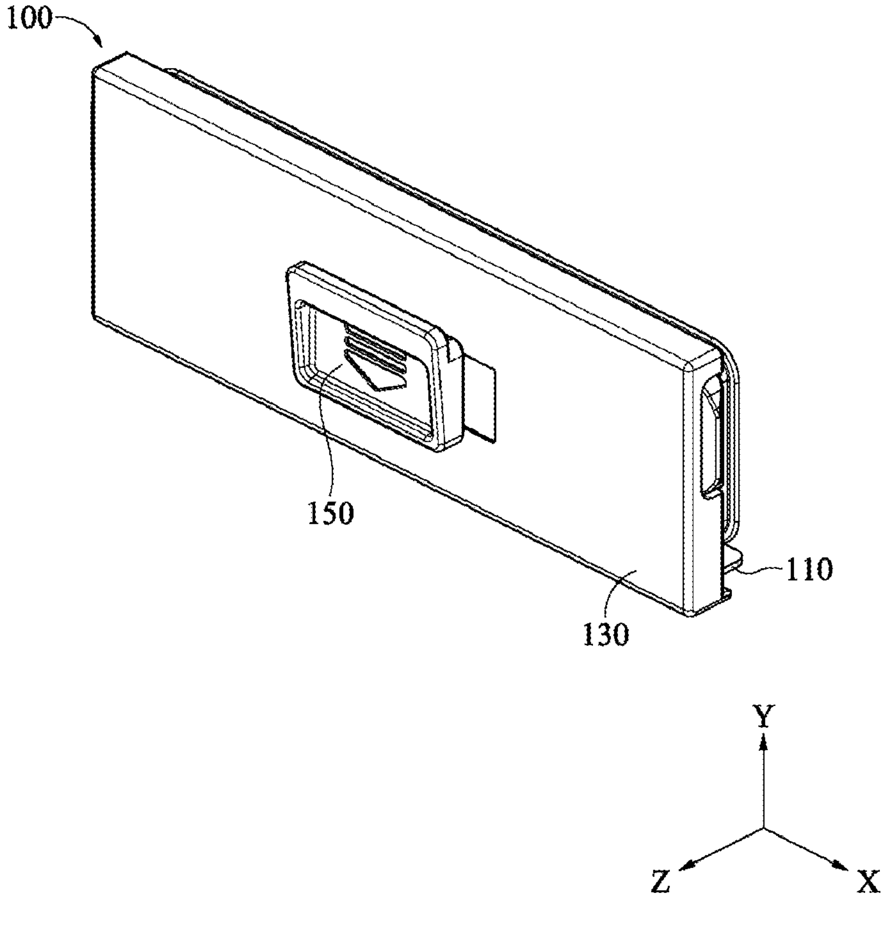
FIG. 2 is a three-dimensional view of a gate assembly according to an embodiment.
Figure 3:
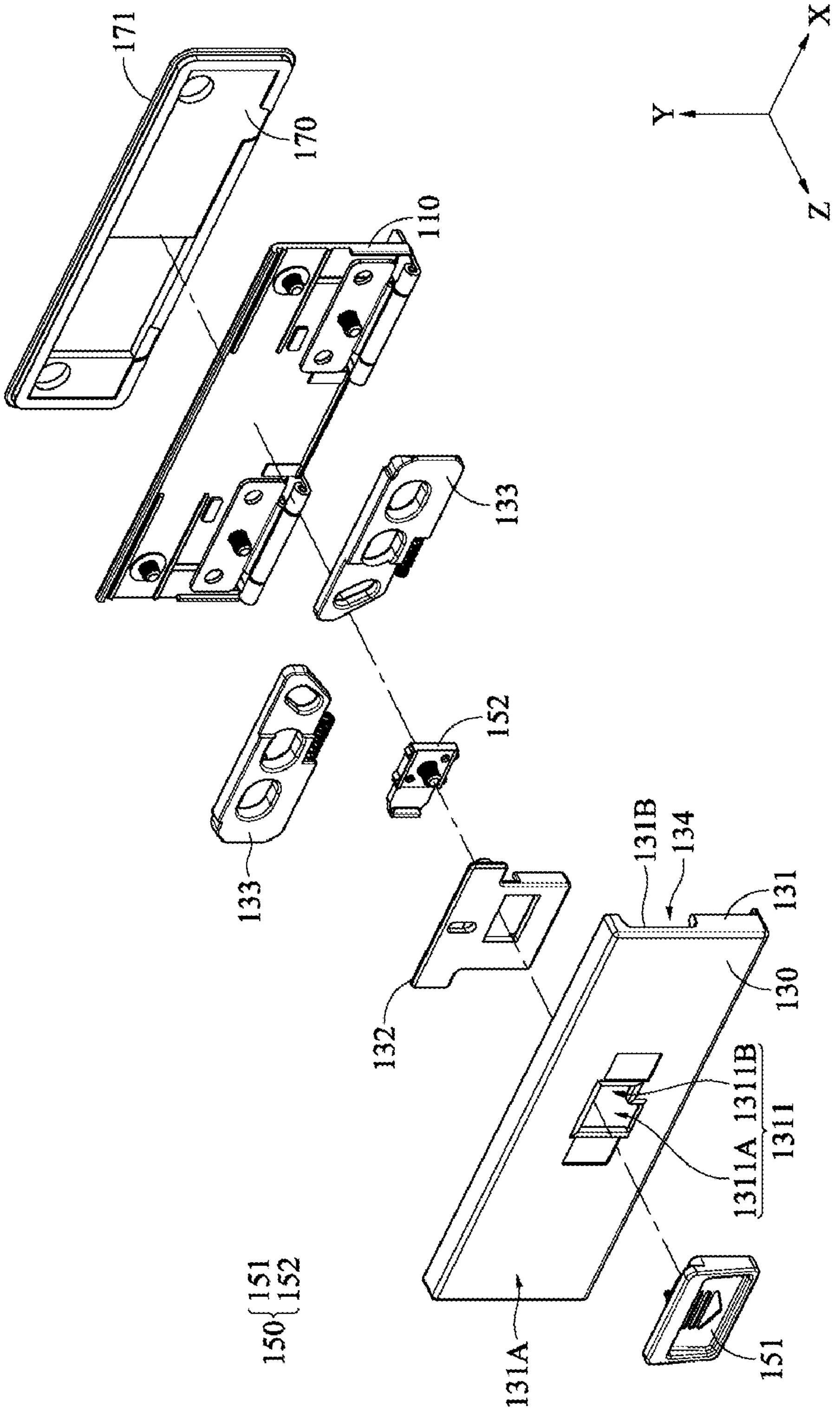
FIG. 3 is an exploded view of a gate assembly according to an embodiment.
Figure 4:
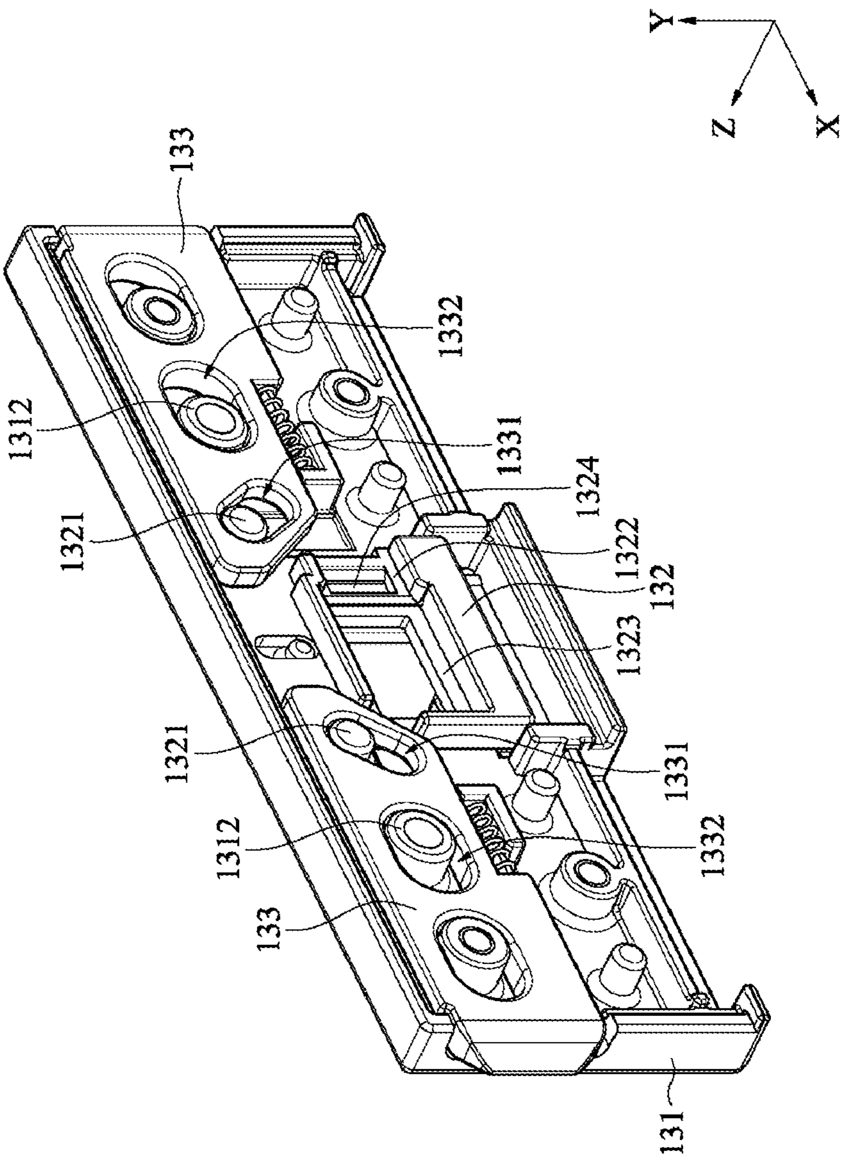
FIG. 4 is a three-dimensional view of a door cover member according to an embodiment.

Refer to FIG. 1. FIG. 1 is a schematic partial view of a casing with a gate assembly according to an embodiment. In this embodiment, a casing 200 is provided with an opening 210 and two engagement grooves 211 located on two opposite sides of the opening 210. A gate assembly 100 is selectively arranged on the casing 200 and correspondingly covers or exposes the opening 210. The gate assembly 100 is arranged on the casing 200 to realize the airtightness function, and has desirable dust-proof and waterproof performance. Refer to FIG. 2 to FIG. 4. FIG. 2 is a three-dimensional view of a gate assembly according to an embodiment. FIG. 3 is an exploded view of a gate assembly according to an embodiment. FIG. 4 is a three-dimensional view of a door cover member according to an embodiment. In this embodiment, a gate assembly 100 includes a base member 110, a door cover member 130, and an operating member 150.

As shown in FIG. 3 and FIG. 4, the door cover member 130 is arranged on the base member 110, and includes a body 131, a movable portion 132, and two gate portions 133. The body 131 is provided with a through slot 1311 and two protruding posts 1312. In this embodiment, the body 131 has a first surface 131A and a second surface 131B on opposite sides. The through slot 1311 extends through the first surface 131A and the second surface 131B. The two protruding posts 1312 are arranged on the second surface 131B.

As shown in FIG. 3 and FIG. 4, the movable portion 132 is arranged on the body 131 and is movable relative to the body 131 along a first axis Y. The movable portion 132 is provided with two limiting posts 1321 and an accommodating portion 1322.

Figure 5:
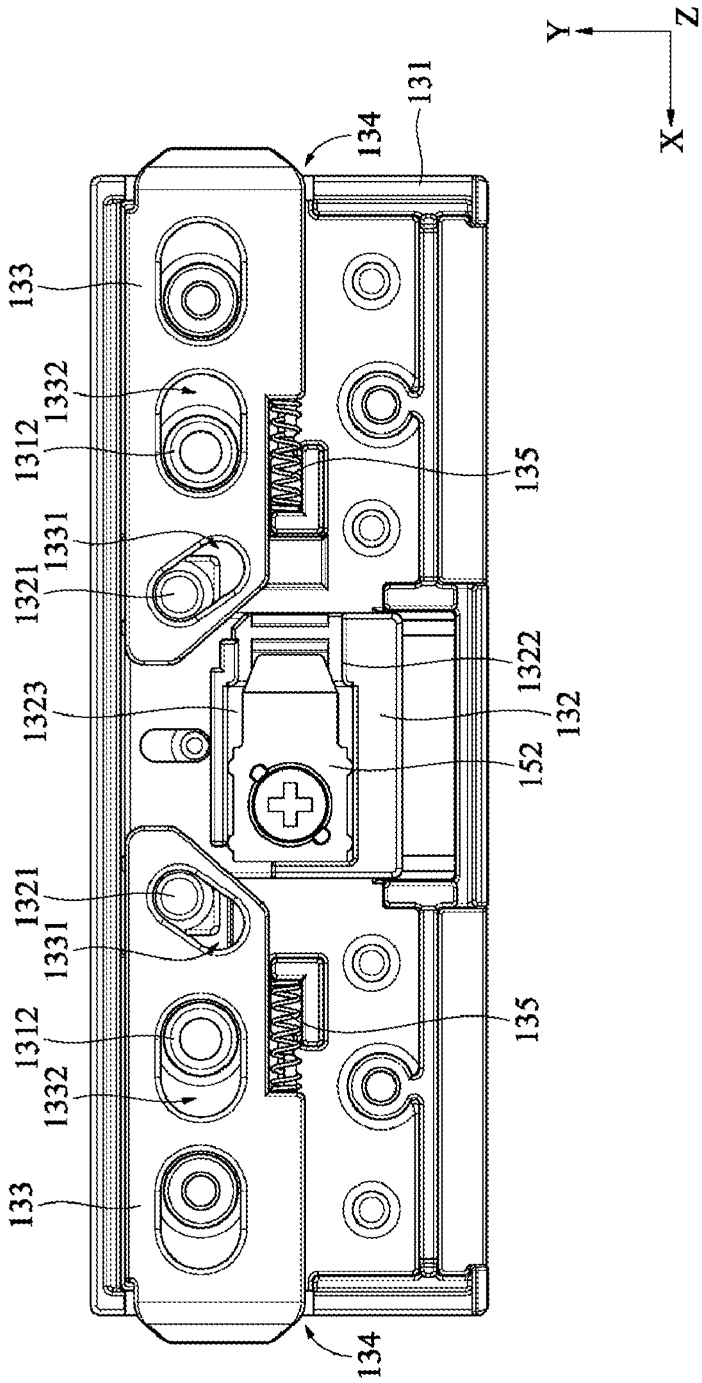
FIG. 5 is a back view (I) of a door cover member according to an embodiment.
Figure 6:
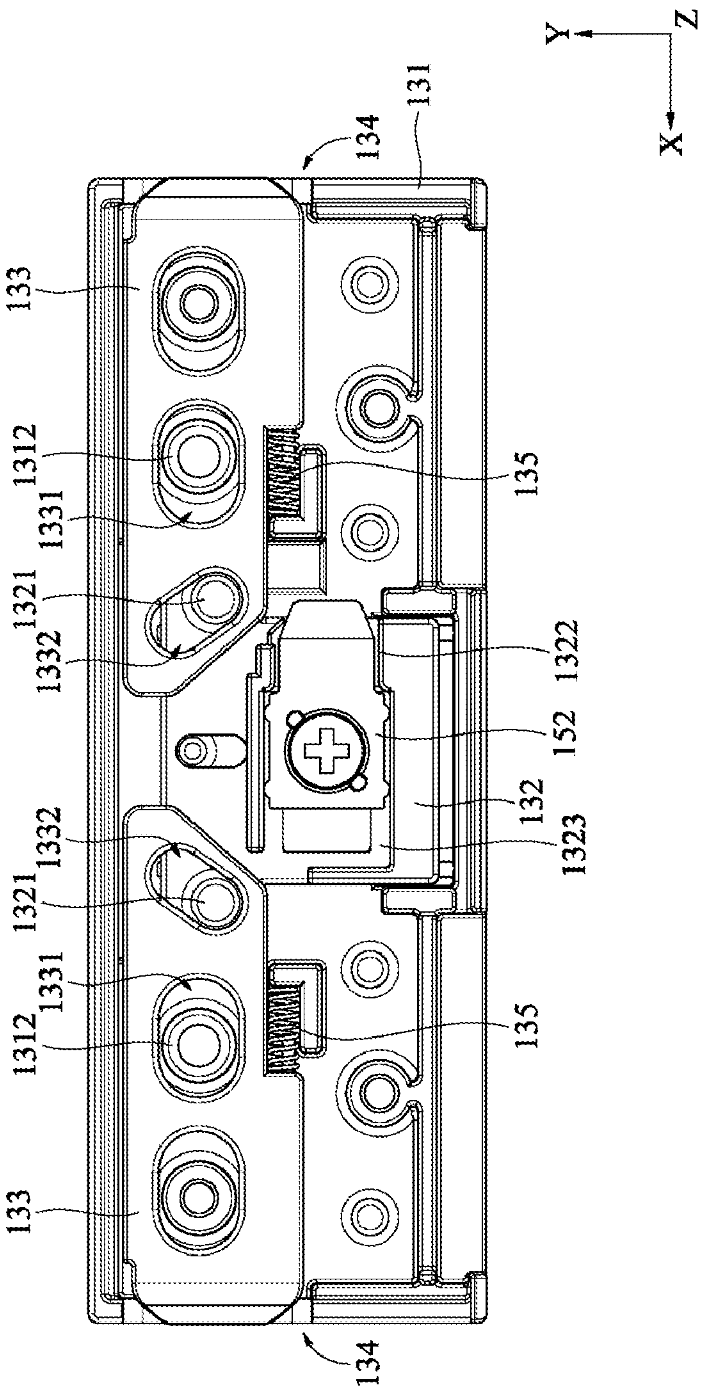
FIG. 6 is a back view (II) of a door cover member according to an embodiment.

Refer to FIG. 5 and FIG. 6. FIG. 5 is a back view (I) of a door cover member according to an embodiment. FIG. 6 is a back view (II) of a door cover member according to an embodiment. Two gate portions 133 are movably arranged on a body 131 and a movable portion 132 along a second axis X. The second axis X and a first axis Y are orthogonal to each other. As shown in FIG. 5 and FIG. 6, the two gate portions 133 are movable left and right relative to the body 131. For the convenience of understanding and description, the first axis Y is referred to as a Y axis, and the second axis X is referred to as an X axis. Each of the gate portions 133 is provided with a limiting hole 1331 arranged in an inclined direction and a positioning hole 1332 arranged along the X axis. The inclined direction herein refers to a direction with respect to the X axis and the Y axis, so that the limiting hole 1331 is not parallel to the X axis or the Y axis. A limiting post 1321 extends through the limiting hole 1331, and a protruding post 1312 extends through the positioning hole 1332. Refer to FIG. 1, FIG. 5, and FIG. 6 again. As shown in FIG. 1 and FIG. 5, when the gate assembly 100 covers the opening 210, a part of each of the gate portions 133 is accommodated in each of the engagement grooves 211 to prevent the gate assembly 100 from being opened. When the gate assembly 100 is to be opened or disassembled, as shown in FIG. 6, the movable portion 132 moves along the Y axis, and the limiting post 1321 moves from one end of the limiting hole 1331 to an other end, so that the two gate portions 133 are close to each other along the X axis to cause a part of the two gate portions 133 to leave each of the engagement grooves 211, and then the gate assembly 100 may be opened or disassembled. Further, when the movable portion 132 moves along the Y axis, the protruding post 1312 is moved from one end of the positioning hole 1332 to an other end of the positioning hole 1332 under the mutual limitation of the positioning hole 1332 and the protruding post 1312, which not only causes the two gate portions 133 to approach each other along the X axis, but also causes the two gate portions 133 to move smoothly along the X axis. In this way, the gate assembly 100 is closed or opened through the movement of the gate portion 133. A stroke required for the movement may be distribute to the Y axis and the X axis through the movable portion 132 and the gate portion 133, respectively, moving toward the Y axis and the X axis, so as to complete the movement of the movable portion 132 and the gate portion 133, which avoids a problem that both the movable portion and the gate portion need to move in the same direction and a larger stroke space needs to be arranged. Further, the stroke space of the gate portion 133 on the X axis may also be reduced through the limiting hole 1331 formed in the inclined direction.

Referring to FIG. 3 to FIG. 6, the operating member 150 extends through the through slot 1311, and includes a holding portion 151 and a latch portion 152. As shown in FIG. 3, the holding portion 151 is located on a side of the first surface 131A of the door cover member 130, the latch portion 152 is located on a side of the second surface 131B of the door cover member 130, and the latch portion 152 extends through the movable portion 132 and the door cover member 130 and is connected to the holding portion 151. In this embodiment, the user may hold the holding portion 151 of the operating member 150 to drive the movable portion 132 to reciprocate along the Y axis by causing the operating member 150 to clamp the movable portion 132. As shown in FIG. 3 to FIG. 6, further, the user may also hold the holding portion 151 of the operating member 150 and reciprocate relative to the movable portion 132 along the X axis, so that a part of the latch portion 152 is accommodated in the accommodating portion 1322 (as shown in FIG. 5) or exposed from the accommodating portion 1322 (as shown in FIG. 6). In this embodiment, as shown in FIG. 5, when the part of the latch portion 152 is accommodated in the accommodating portion 1322, the movement of the operating member 150 in the Y axis is restricted, and the movable portion 132 cannot be driven to move. As shown in FIG. 6, when the part of the latch portion 152 is exposed from the accommodating portion 1322, the user may drive the movable portion 132 to move along the Y axis through the operating member 150. Regarding the structure restricting the operating member 150, as shown in FIG. 3, in this embodiment, the through slot 1311 has a first guide slot 1311A and a second guide slot 1311B. The first guide slot 1311A is formed along the Y axis, and the second guide slot 1311B is located on an end of the first guide slot 1311A and formed along the X axis. Refer to FIG. 3, FIG. 5, and FIG. 6 together. In this embodiment, the operating member 150 moves in the first guide slot 1311A along the Y axis to drive the movable portion 132 to move. When the operating member 150 moves into the second guide slot 1311B along the X axis, the operating member 150 deviates from a path of the first guide slot 1311A and therefore cannot move along the Y axis, and the part of the latch portion 152 as shown in FIG. 5 is to be accommodated in the accommodating portion 1322. In this way, to prevent the gate assembly 100 from being opened due to accidental touching by the user, the operating member 150 may be moved to the second guide slot 1311B, and a part of the latch portion 152 may be accommodated in the accommodating portion 1322, so as to prevent the operating member 150 from moving along the Y axis. When the user wants to remove the restriction on the movement of the operating member 150 along the Y axis, the operating member 150 may be moved back to the path of the first guide slot 1311A along the X axis, so that the operating member 150 may move along the Y axis. In this state, as shown in FIG. 6, the part of the latch portion 152 is to be exposed from the accommodating portion 1322.

Specifically, in the gate assembly 100 of this embodiment, the movable portion 132 is driven to move along the Y axis through the operating member 150, and the gate portion 133 is caused to move along the X axis orthogonal to the Y axis. In this way, the gate portion 133 is driven to move through the movement in different directions, so that the movement stroke in the same direction is reduced, so as to reduce a size of the gate assembly 100. Further, by allowing a part of the latch portion 152 of the operating member 150 to be accommodated in or exposed from the accommodating portion 1322 on the X axis, the movement of the operating member 150 on the Y axis may be selectively restricted, to prevent the gate assembly 100 from being opened due to accidental touch by the user.

Refer to FIG. 1, FIG. 3, FIG. 5, and FIG. 6 again. In this embodiment, the door cover member 130 further includes two open portions 134 located on opposite sides. The two gate portions 133 move along the X axis to selectively expose a part thereof from the two open portions 134, so that a part of each of the gate portions 133 may be accommodated in the corresponding engagement groove 211.

Refer to FIG. 5 and FIG. 6. In this embodiment, the door cover member 130 further includes two elastic members 135. Two ends of each of the elastic members 135 are connected to each of the gate portions 133 and the body 131 along the X axis. The elastic member 135 is, for example, a spring. The elastic member 135 may continuously push against the gate portion 133 due to an elastic force thereof to keep the two gate portions 133 away from each other and cause a part of the gate portion to be accommodated in the corresponding engagement groove 211. When the gate assembly 100 is to be opened or disassembled from the casing 200, after the user applies a force along the Y axis through the operating member 150 to drive the gate portions 133 to move closer to each other along the X axis, and then the elastic member 135 is compressed. When the user stops applying the force along the Y axis through the operating member 150, the elastic member 135 recovers due to its elasticity and pushes against the two gate portions 133 away from each other. In this way, the elastic member 135 keeps the two gate portions 133 away from each other, which can avoid omitting the step of accommodating a part of each of the gate portions 133 in each of the engagement grooves 211 when the user assembles the gate assembly 100 to the casing 200.

Figure 7:
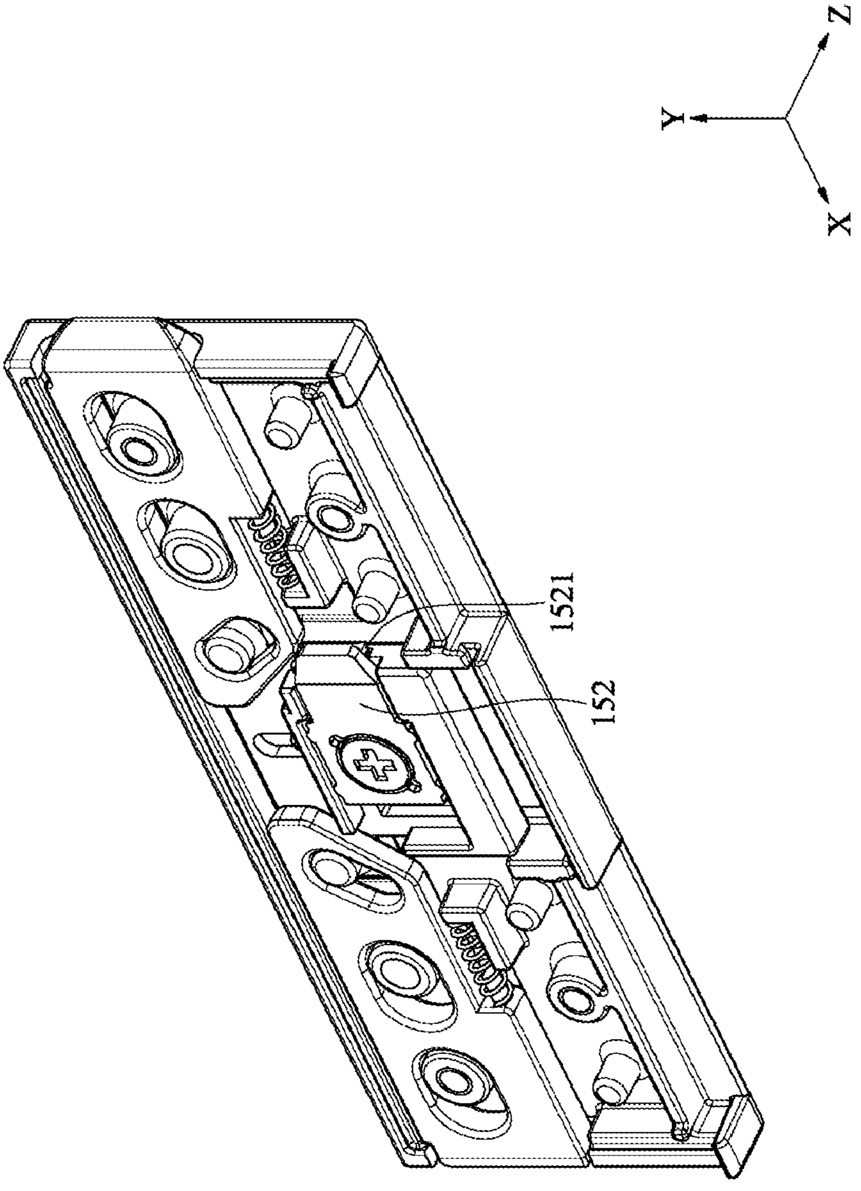
FIG. 7 is a three-dimensional view of a door cover member according to an embodiment from another perspective.

Refer to FIG. 4 to FIG. 6 again. In this embodiment, the movable portion 132 is provided with a slide rail groove 1323 formed along the X axis. The accommodating portion 1322 is arranged on an end of the slide rail groove 1323, and the latch portion 152 is movably arranged in the slide rail groove 1323 along the X axis, so that a part of the latch portion 152 is accommodated in or exposed from the accommodating portion 1322. Further, refer to FIG. 4, FIG. 5, and FIG. 7 together. FIG. 7 is a three-dimensional view of a door cover member according to an embodiment from another perspective. In this embodiment, the latch portion 152 is provided with a hook 1521, and the accommodating portion 1322 is provided with a groove 1324. The latch portion 152 reciprocates in the accommodating portion 1322, so that the hook 1521 may selectively leave or be accommodated in the groove 1324 as shown in FIG. 4. For example, as shown in FIG. 4 and FIG. 5, when the part of the latch portion 152 is accommodated in the accommodating portion 1322, the hook 1521 is accommodated in the groove 1324. In this way, the movement of the operating member 150 along the Y axis is restricted, and the latch portion 152 can be prevented from moving along the X axis. As shown in FIG. 4 and FIG. 7, when the user wants to release the restriction of the operating member 150, the user pushes the operating member 150 along the X axis by applying a force, so that a part of the latch portion 152 is exposed from the accommodating portion 1322, and the hook 1521 leaves the groove 1324, thereby causing the operating member 150 to move along the Y axis. In addition, when the hook 1521 enters or leaves the groove 1324, a state of the latch portion 152 may be readily sensed by the user as a result of a mold mismatch.

Figure 8:
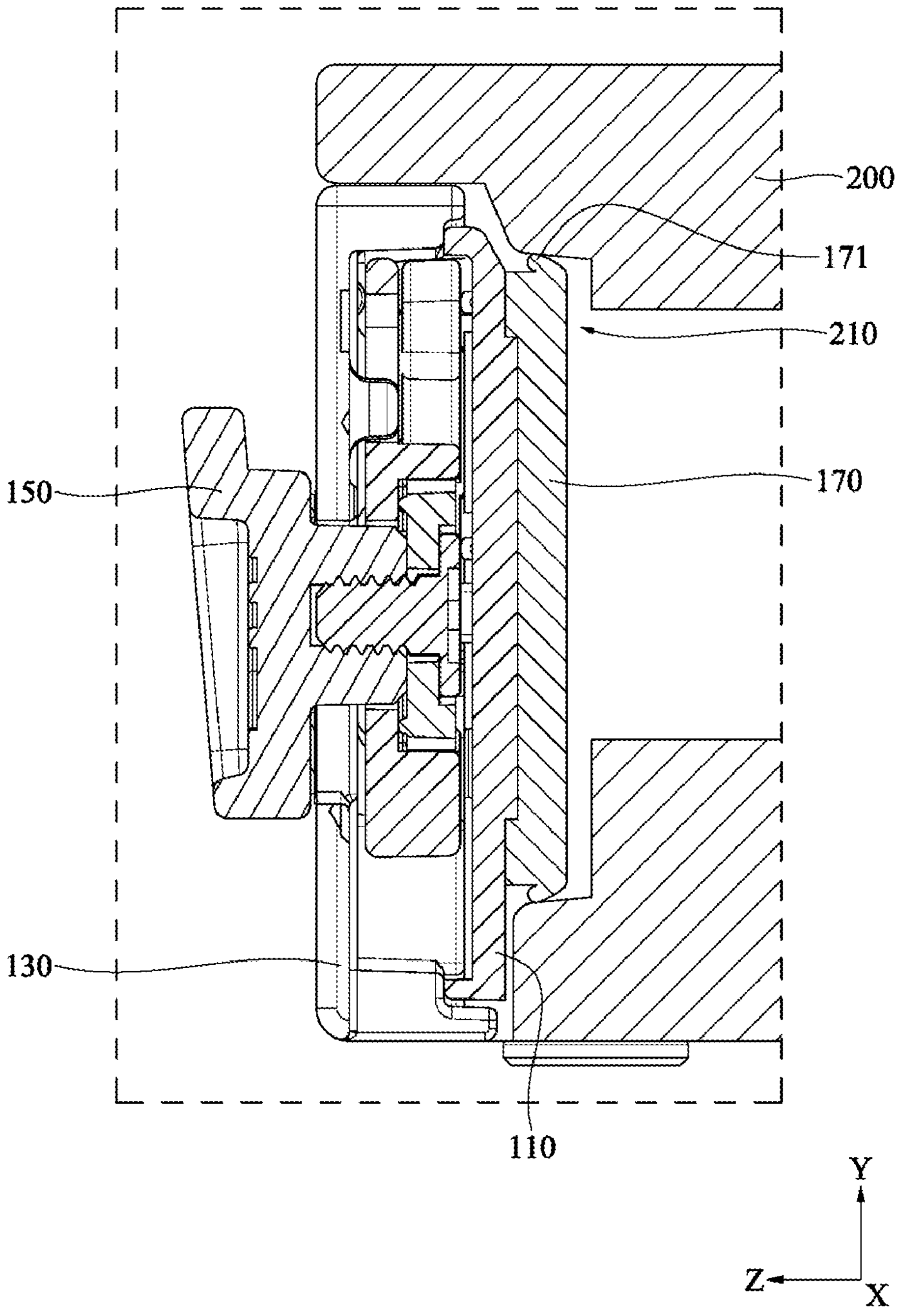
FIG. 8 is a partial cross-sectional view of a casing with a gate assembly according to an embodiment.

Refer to FIG. 3 and FIG. 8. FIG. 8 is a partial cross-sectional view of a casing with a gate assembly according to an embodiment. In this embodiment, the gate assembly further includes a soft rubber member 170. The soft rubber member 170 is arranged on a side of the base member 110 opposite the door cover member 130. It may be seen from FIG. 8 that the door cover member 130 is arranged on a side of the base member 110 facing outside of the casing 200, and the soft rubber member 170 is arranged on a side of the base member 110 facing inside of the casing 200. In this embodiment, the soft rubber member 170 is provided with an outer ring portion 171 arranged around a periphery of the soft rubber member 170. Since the overall size of the outer ring portion 171 is slightly larger than that of the opening 210, when the gate assembly 100 covers the opening 210, the outer ring portion 171 is to interfere with the casing 200. Since the outer ring portion 171 closely contacts a wall surface at the opening 210 of the casing 200, the outer ring portion 171 is squeezed by the wall surface and deforms elastically. In this way, the airtight function of the gate assembly 100 is further improved.

What is claimed is:

1. A gate assembly, comprising:

a base member;

a door cover member, arranged on the base member and comprising:

a body, provided with a through slot and two protruding posts;

a movable portion, arranged on the body and movable relative to the body along a first axis, wherein the movable portion is provided with two limiting posts and an accommodating portion; and two gate portions, movably arranged on the body and the movable portion, wherein each of the gate portions is provided with a limiting hole formed in an inclined direction and a positioning hole formed along a second axis orthogonal to the first axis, each of the limiting posts extends through the limiting hole, each of the protruding posts extends through the positioning hole, and when the movable portion moves along the first axis, the limiting post moves from one end of the limiting hole to an other end, and the protruding post moves from one end of the positioning hole to an other end to drive and limit movement of each of the gate portions along the second axis; and an operating member, extending through the through slot and comprising a holding portion and a latch portion, wherein the holding portion is located on one side of the door cover member, and the latch portion is located on an other side of the door cover member, and extends through the movable portion and the door cover member and is connected to the holding portion, wherein the operating member is configured to drive the movable portion to reciprocate along the first axis and reciprocate relative to the movable portion along the second axis, so that a part of the latch portion is accommodated in or exposed from the accommodating portion.

2. The gate assembly according to claim 1, wherein the door cover member further comprises two open portions located on opposite sides, and the two gate portions move along the second axis to selectively expose a part thereof from the two open portions.

3. The gate assembly according to claim 1, wherein the door cover member further comprises two elastic members, and two ends of each of the elastic members are connected to each of the gate portions and the body along the second axis.

4. The gate assembly according to claim 1, wherein the through slot has a first guide slot and a second guide slot, the first guide slot is formed along the first axis, and the second guide slot is located on an end of the first guide slot and formed along the second axis.

5. The gate assembly according to claim 4, wherein the movable portion is provided with a slide rail groove formed along the second axis, the accommodating portion is arranged on an end of the slide rail groove, and the latch portion is movably arranged in the slide rail groove along the second axis.

6. The gate assembly according to claim 4, wherein the latch portion is provided with a hook, the accommodating portion is provided with a groove, and the latch portion reciprocates in the accommodating portion, so that the hook leaves or is accommodated in the groove.

7. The gate assembly according to claim 1, further comprising a soft rubber member, wherein the soft rubber member is arranged on a side of the base member opposite the door cover member.

8. The gate assembly according to claim 7, wherein the soft rubber member is provided with an outer ring portion arranged around a periphery of the soft rubber member.

9. A casing with a gate assembly, comprising:

a casing, provided with an opening and two engagement grooves located on two opposite sides of the opening; and a gate assembly, arranged on the casing and correspondingly covering or exposing the opening, wherein the gate assembly comprises:

a base member;

a door cover member, arranged on the base member and comprising:

a body, provided with a through slot and two protruding posts;

a movable portion, arranged on the body and movable relative to the body along a first axis, wherein the movable portion is provided with two limiting posts and an accommodating portion; and two gate portions, movably arranged on the body and the movable portion, wherein each of the gate portions is provided with a limiting hole formed in an inclined direction and a positioning hole formed along a second axis orthogonal to the first axis, each of the limiting posts extends through the limiting hole, each of the protruding posts extends through the positioning hole, and when the movable portion moves along the first axis, the limiting post moves from one end of the limiting hole to an other end, and the protruding post moves from one end of the positioning hole to an other end to drive and limit movement of each of the gate portions along the second axis; and an operating member, extending through the through slot and comprising a holding portion and a latch portion, wherein the holding portion extends to one side of the door cover member, and the latch portion is connected to the movable portion and located on an other side of the door cover member, wherein the operating member is configured to drive the movable portion to reciprocate along the first axis and reciprocate relative to the movable portion along the second axis, so that a part of the latch portion is accommodated in or exposed from the accommodating portion; and when the gate assembly covers the opening, a part of each of the gate portions selectively leaves or is accommodated in each of the engagement grooves along the second axis.

10. The casing with a gate assembly according to claim 9, further comprising a soft rubber member, wherein the soft rubber member is arranged on a side of the base member opposite the door cover member, the soft rubber member is provided with an outer ring portion arranged around a periphery of the soft rubber member, and the outer ring portion is in close contact with the casing and is squeezed and deformed due to elasticity of the outer ring portion.

* * * * *